United States Patent
Wang (10) Patent No.: US 9,824,121 B2
(45) Date of Patent: Nov. 21, 2017

(54) AGGREGATE DATA STREAMS IN RELATIONAL DATABASE SYSTEMS

(71) Applicant: ARRIS Enterprises, Inc., Suwanee, GA (US)

(72) Inventor: Tong Wang, Portland, OR (US)

(73) Assignee: ARRIS Enterprises LLC, Suwanee, GA (US)

( * ) Notice: Subject to any disclaimer, the term of this patent is extended or adjusted under 35 U.S.C. 154(b) by 182 days.

(21) Appl. No.: 13/962,170

(22) Filed: Aug. 8, 2013

(65) Prior Publication Data

US 2014/0046975 A1 Feb. 13, 2014

Related U.S. Application Data

(60) Provisional application No. 61/681,959, filed on Aug. 10, 2012.

(51) Int. Cl.
*G06F 7/00* (2006.01)
*G06F 17/30* (2006.01)

(52) U.S. Cl.
CPC .............. *G06F 17/30516* (2013.01)

(58) Field of Classification Search
CPC ............. G06F 17/2258; G06F 17/27; G06F 17/30412; G06F 17/30424; G06F 17/30516; G06F 17/30536; G06F 17/30979; G06F 2201/875; G06F 11/3055; G06F 11/323; G06F 11/324; G06Q 10/063114; G06Q 30/0282; G06C 30/0282; H04L 41/22; H04L 43/026; H04L 43/045; H04L 43/06; H04W 16/10; H04W 4/00; H04W 76/025; H04W 84/00; H04W 4/003; Y10S 707/99952; Y10S 707/99943
See application file for complete search history.

(56) References Cited

U.S. PATENT DOCUMENTS

| | | | | |
|---|---|---|---|---|
| 6,581,054 | B1 * | 6/2003 | Bogrett | G06F 17/30395 |
| 7,672,964 | B1 * | 3/2010 | Yan | G06F 17/30516 |
| | | | | 707/999.102 |
| 2001/0013030 | A1 * | 8/2001 | Colby | G06F 17/30312 |
| 2002/0116417 | A1 * | 8/2002 | Weinberg | G06F 17/243 |
| | | | | 715/212 |
| 2003/0110189 | A1 * | 6/2003 | Agrawal et al. | 707/203 |
| 2004/0177084 | A1 * | 9/2004 | Agrawal | G06F 17/30418 |
| 2005/0039033 | A1 * | 2/2005 | Meyers | G06F 17/30392 |
| | | | | 713/193 |

(Continued)

FOREIGN PATENT DOCUMENTS

WO WO 0146866 A2 * 6/2001 ....... G06F 17/30539

OTHER PUBLICATIONS

InfoSleuth: Agent-Based Semantic Integration of Infromation in Open and Dynamic Environments, Bayardo et al, ACM, pp. 195-206, 1997.*

(Continued)

*Primary Examiner* — Augustine K Obisesan
(74) *Attorney, Agent, or Firm* — Bart A. Perkins (57) ABSTRACT

Methods, systems, and computer readable media can provide for aggregating high-rate, large-volume input data streams into low-volume output data streams in real-time. Aggregating high-rate, large-volume data streams into low-volume output data streams can be facilitated by analyzing lossless aggregation relationships among helper views within one or more continuous query tasks and executing conventional queries to derive high-level, low-volume output data streams from low-level, high-volume input data streams.

13 Claims, 4 Drawing Sheets

(56) References Cited

U.S. PATENT DOCUMENTS

| | | | |
|---|---|---|---|
| 2005/0091208 A1* | 4/2005 | Larson | G06F 17/30451 |
| 2006/0129933 A1* | 6/2006 | Land et al. | 715/723 |
| 2007/0136254 A1* | 6/2007 | Choi | G06F 17/30516 |
| 2007/0198469 A1* | 8/2007 | Shriraghav | G06F 17/30451 |
| 2007/0226239 A1* | 9/2007 | Johnson | H04L 43/022 |
| 2007/0239744 A1* | 10/2007 | Bruno | G06F 17/30312 |
| 2008/0027970 A1* | 1/2008 | Zhuge | G06F 17/30595 |
| 2008/0120283 A1* | 5/2008 | Liu et al. | 707/4 |
| 2009/0006346 A1* | 1/2009 | C N | G06F 17/30454 |
| 2009/0106218 A1* | 4/2009 | Srinivasan | G06F 17/30516 |
| 2009/0125536 A1* | 5/2009 | Lu et al. | 707/101 |
| 2009/0164414 A1* | 6/2009 | Tatzel | G06F 17/30477 |
| 2009/0182779 A1* | 7/2009 | Johnson | G06F 17/30383 |
| 2009/0279559 A1* | 11/2009 | Wong | H04L 49/30 370/412 |
| 2009/0319499 A1* | 12/2009 | Meijer et al. | 707/4 |
| 2010/0042606 A1* | 2/2010 | Srivastava | G06F 17/30489 707/718 |
| 2010/0049736 A1* | 2/2010 | Rolls | G06F 17/30294 707/E17.055 |
| 2011/0173231 A1* | 7/2011 | Drissi et al. | 707/771 |
| 2011/0307503 A1* | 12/2011 | Dlugosch | G06K 9/00973 707/758 |
| 2012/0166469 A1* | 6/2012 | Cammert et al. | 707/769 |
| 2012/0323956 A1* | 12/2012 | Dumitru et al. | 707/769 |

OTHER PUBLICATIONS

On Computing correlated aggregates over continual data streams, Gehrke et al, ACM SIGMOD, pp. 13-24, 2001.*

* cited by examiner

AGGREGATE DATA STREAMS IN RELATIONAL DATABASE SYSTEMS

CROSS REFERENCE TO RELATED APPLICATION

This application is a non-provisional application claiming the benefit of U.S. Provisional Application Ser. No. 61/681,959, entitled "Aggregate Data Streams in Relational Database Systems," which was filed on Aug. 10, 2012, and is incorporated herein by reference in its entirety.

TECHNICAL FIELD

This disclosure relates to aggregating low-level, high-rate data streams into high-level, low-volume data streams continuously in real time.

BACKGROUND

Enterprise applications can carry out a variety of functions, such as data and/or information management, and can be used by a plurality of users, typically through a computer network. Generally, enterprise applications are faced with the task of processing high-volume input data and presenting results to users in real-time. Various enterprise applications can receive continuous query tasks from users, and users typically expect such continuous query task results to be obtained and presented in real-time.

BRIEF DESCRIPTION OF THE DRAWINGS

Like reference numbers and designations in the various drawings indicate like elements.

DETAILED DESCRIPTION

Enterprise application developers face a challenge in quickly processing ever growing amounts of high-volume input data and presenting the data in real-time to meet complex operational requirements. Research has been conducted on data streams and continuous queries associated with high-volume input data. However, data stream processing in enterprise applications still presents a challenge, particularly data stream processing by a single relational database system. For example, application developers face the challenge of efficiently displaying multiple sets of aggregated data streams (e.g., data streams aggregated from one or more input data streams) on a dashboard simultaneously, while maintaining each set of aggregated data streams in its own sliding window. In some implementations of this disclosure, a continuous data stream aggregation engine based on the concept of view groups in a relational database system can be operable to more efficiently accept incoming data streams and send outgoing summary data streams to a plurality of application components. Furthermore, lossless aggregation relationships (e.g., relationships between a plurality of views which allow the views to be aggregated without losing information stored in the views or accuracy in the aggregation) among views in a view group can be applied in the optimization of a continuous aggregation algorithm. For example, a count of the number of operations taking place over a one hour period has a lossless aggregation relationship with the counts of the number of operations taking place over each of the sixty, one minute periods within the one hour period, because the hour count can be calculated directly from the minute counts accurately and without losing any information.

In some implementations, large amounts of input data can be organized and summary data associated with the input data can be presented in a live enterprise dashboard. A typical dashboard can contain multiple sets of application data or widgets, which in turn, can display aggregated data in near real-time. In some implementations of this disclosure, the presentation of multiple sets of aggregated data in real-time can be facilitated by efficiently and accurately deriving output data from high-rate, large-volume input data.

Traditional relational database language constructs (e.g., materialized views) and aggregate functions are generally insufficient to present summary data associated with high-rate, large-volume input data in real-time. In some implementations of this disclosure, an add-on component with stream aggregation features coupled with a conventional database management system (DBMS) can facilitate the aggregation of high-rate, large-volume input data streams into low-volume output data streams continuously and efficiently inside the boundary of the DBMS. In various implementations of this disclosure, the simplicity of a single-system design can be achieved and continuous query requirements can be met by separating an aggregation engine from a DBMS, thereby eliminating a requirement for extensions to structured query language (SQL) constructs or of adding special Data Stream Management System (DSMS).

Figure 1:
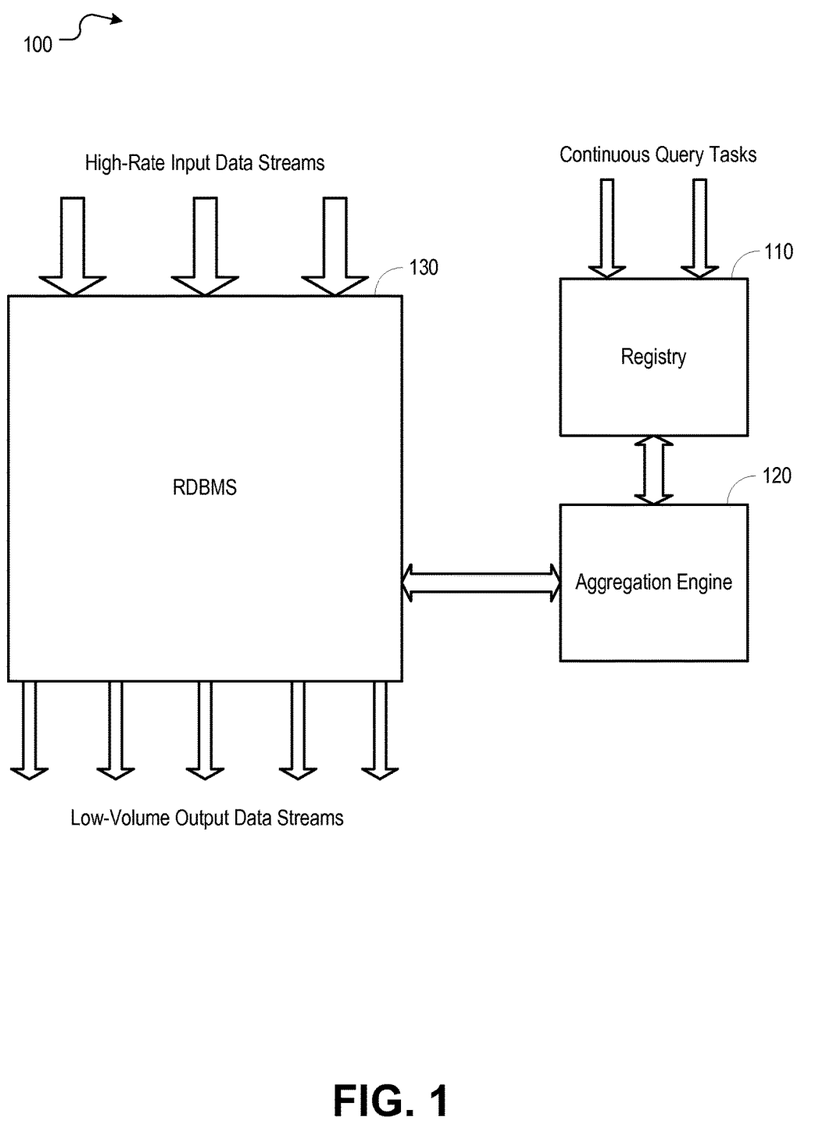
FIG. 1 is a block diagram illustrating an example system operable to aggregate low-level, high-rate input data streams into high-level, low volume output data streams.

FIG. 1 is a block diagram illustrating an example system 100 operable to aggregate low-level, high-rate input data streams into high-level, low volume output data streams. In some implementations, the system 100 can include a registry 110, an aggregation engine 120, and a relational database management system (RDBMS) 130.

In some implementations, a registry 110 can store a list of continuous query tasks generated from application requirements. For example, the registry can receive a list of continuous query tasks from an application, or other source, and can store the list of continuous query tasks inside the registry. In various implementations, the registry can send a query task to an aggregation engine 120. In some implementations, the list of query tasks stored in the registry can change continuously. For example, new tasks received from an application can be entered into the registry and tasks that are no longer needed can be removed from the registry.

In some implementations, an aggregation engine 120 can parse a query task into conventional queries and helper views associated with the conventional queries. For example, an aggregation engine can receive a query task from a registry 110 and can parse the query task into a series of SQL queries and a set of helper views which can function as temporary tables. In various implementations, the helper views can be used by an RDBMS 130 as input and/or output tables for the series of SQL queries. For example, the aggregation engine can define an input helper view and an output helper view to be used during the execution of each of the SQL queries.

In some implementations, the aggregation engine 120 can organize the helper views into one or more helper view families. For example, the aggregation engine can identify a first helper view in a list of helper views and can place the first helper view into a first helper view family. The aggregation engine can then identify a next helper view in the list of helper views and can determine whether the next helper view has a lossless aggregation relationship with at least one of the helper views in the first helper view family. Where the next helper view does have a lossless aggregation relationship with at least one of the helper views in the first helper view family, the next helper view can be placed in the first helper view family. Where the next helper view does not have a lossless aggregation relationship with any one of the helper views in the first helper view family, the next helper view can be placed in a next helper view family. In some implementations, the aggregation engine can continue this process of placing helper views into helper view families by identifying the remaining helper views in the list of helper views and placing them into helper view families.

In some implementations, after helper views have been organized into one or more helper view families, the aggregation engine 120 can merge helper view families that share a common helper view. For example, the aggregation engine can compare each of the helper views in a first helper view family to each of the helper views in a next helper view family, and if the first helper view family and the next helper view family share at least one helper view in common with each other, the helper views in the next helper view family can be merged into the first helper view family.

In some implementations, the aggregation engine 120 can generate a family hierarchy based on the relationships between helper views in a helper view family. For example, input data can be stored in an operation table, and the operation table can be placed at the bottom of the family hierarchy. One or more helper views that can be populated directly from the operation table can be placed directly above the operation table in the family hierarchy. In various implementations, lossless relationships among helper views can be analyzed and where a higher level view can be derived from a lower level view without the loss of information or accuracy, the higher level view can be placed directly above the lower level view in the family hierarchy. For example, one or more helper views that can be populated directly from another helper view in the family hierarchy can be placed directly above the other helper view in the family hierarchy (e.g., an hourly count view can be populated directly from a plurality of minute count views, thus the hourly count view can be placed directly above the minute count view in the family hierarchy 300 of FIG. 3).

In various implementations, a helper view can be populated from a plurality of other helper views in a family hierarchy. For example, a minute average view can be derived from the combination of a minute count view and a minute sum view, thus the minute average view can be placed directly above both the minute count view and minute sum view in the family hierarchy 300 of FIG. 3.

In some implementations, the RDBMS 130 can be used as a repository store. For example, data stream repositories and continuous query tasks can be mapped onto the RDBMS. In this example, the RDBMS can receive instructions for creating helper views from an aggregation engine 120, and can store helper views and SQL queries associated with the helper views. In some implementations, processing capabilities of the RDBMS can be used to aggregate input data streams on a relation-to-relation basis. For example, input data streams can be stored in continuous, append-only relations upon which database queries can be processed.

In some implementations, the RDBMS can accept input data streams from one or more sources and send output data streams to one or more targets. For example, input data streams can be stored in an append-only source table and output data streams can be stored in an append-only destination table. As input data streams are received and output data streams are generated, the contents of the source table and the contents of the destination table can be continuously appended. The source table can be treated as a starting helper view and the destination table can be treated as an ending helper view. In various implementations, the RDBMS can store historical summary data, in temporary relations, for participating in other queries.

In some implementations, the RDBMS 130 can execute SQL queries associated with helper views in a family hierarchy and populate the helper views in the family hierarchy. Moreover, in some implementations, the RDBMS can populate a higher view by deriving data from a lower view in a hierarchy, thereby, keeping the data involved in a calculation to a minimum. Generally, a higher level view can have coarser granularity than a lower level view, thus the data stored by a higher level view is typically smaller than the data stored by a lower level view, and the smaller amount of data can correlate to achieving faster query results.

In some implementations, the RDBMS can identify a helper view in the family hierarchy and can identify an SQL query associated with the identified helper view. For example, the RDBMS can identify an SQL query from a series of SQL queries parsed from a query task by the aggregation engine 120. In various implementations, the RDBMS 130 can populate each helper view in a family hierarchy by executing the SQL query associated with each of the helper views. For example, an SQL query associated with a helper view can instruct the RDBMS to retrieve data from one or more input tables associated with the helper view and populate one or more output tables (e.g., the series of SQL queries can instruct the RDBMS to read from input helper views and write to output helper views until the destination table is populated).

In various implementations, a timer can trigger the aggregation process. For example, the aggregation of an hourly count view can proceed when the minute count views within the hour associated with the hourly count view have been populated.

Figure 2:
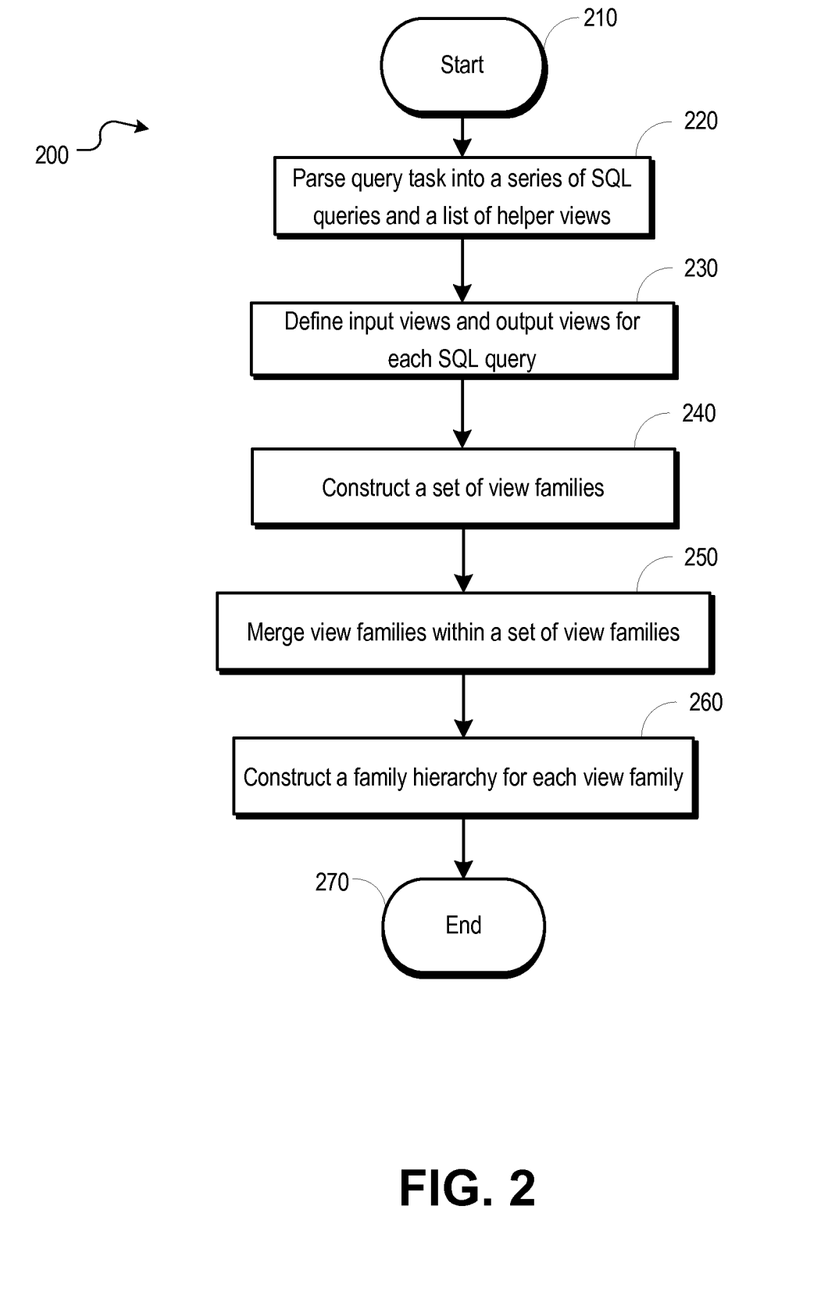
FIG. 2 is a flowchart illustrating an example process operable to construct one or more view family hierarchies from continuous query tasks.

FIG. 2 is a flowchart illustrating an example process 200 operable to construct one or more view family hierarchies from continuous query tasks. The process 200 can start at stage 210 when an aggregation engine receives one or more query tasks.

After a query task is received, the process 200 can proceed to stage 220. At stage 220, query tasks can be parsed into a series of SQL queries and a list of helper views. Query tasks can be parsed into a series of SQL queries and a list of helper views, for example, by an engine associated with a RDBMS (e.g., aggregation engine 120 of FIG. 1). For example, an aggregation engine 120 can separate a query task into SQL queries and helper views and can store the SQL queries and helper views separately. In some implementations, received query tasks can be stored in a list in a registry 110 of FIG. 1.

After query tasks are parsed into a series of SQL queries and a list of helper views, the process 200 can proceed to stage 230. At stage 230, input and output views can be defined for each SQL query. Input and output views for each SQL query can be defined, for example, by an engine associated with a RDBMS (e.g., aggregation engine 120). In some implementations, one or more input views associated with an SQL query can be defined based on the input data used to populate a view. For example, the minute average view of the family hierarchy 300 of FIG. 3 can be derived from a combination of the minute count view and the minute sum view, thus the minute count view and the minute sum view can be defined as input views for the SQL query associated with the minute average view.

In various implementations, the one or more output views associated with an SQL query can be the one or more views that are populated through execution of the SQL query. For example, the SQL query associated with the hourly count view of the family hierarchy 300 of FIG. 3 can populate the hourly count view. Thus the hourly count view can be defined as the output view for the SQL query associated with the hourly count view.

After input and output views are defined for each SQL query, the process 200 can proceed to stage 240. At stage 240, a set of view families can be constructed. A set of view families can be constructed, for example, by an engine associated with a RDBMS (e.g., aggregation engine 120). For example, each helper view parsed from one or more query tasks can be stored in a view family. In various implementations, a plurality of helper views parsed from one or more query tasks can be stored in a view family in such a manner that each of the helper views within the view family has a lossless aggregation relationship with at least one other helper view in the view family. In some implementations, a view family can consist of a single helper view.

After a set of view families is constructed, the process 200 can proceed to stage 250. At stage 250, view families within a set of view families can be merged together. View families within a set of view families can be merged, for example, by an engine associated with a RDBMS (e.g., aggregation engine 120). In some implementations, an aggregation engine 120 can merge view families that share a common helper view. For example, the aggregation engine 120 can compare each of the helper views in a first view family to each of the helper views in a next view family, and if the first view family and the next view family share at least one helper view in common with each other, the helper views in the next view family can be merged into the first view family.

After view families are merged together, the process 200 can proceed to stage 260. At stage 260, a family hierarchy can be constructed for each view family within a set of view families. In some implementations, a family hierarchy can be built according to the relationships among the helper views within a view family. In various implementations, lossless relationships among helper views can be analyzed and where a higher level view can be derived from a lower level view without the loss of information or accuracy, the higher level view can be placed directly above the lower level view in the family hierarchy. For example, one or more helper views that can be populated directly from another helper view in the family hierarchy can be placed directly above the other helper view in the family hierarchy (e.g., an hourly count view can be populated directly from a plurality of minute count views, thus the hourly count view can be placed directly above the minute count view in the family hierarchy 300 of FIG. 3). After a family hierarchy is constructed for each view family, the process 200 can end at stage 270.

Figure 3:
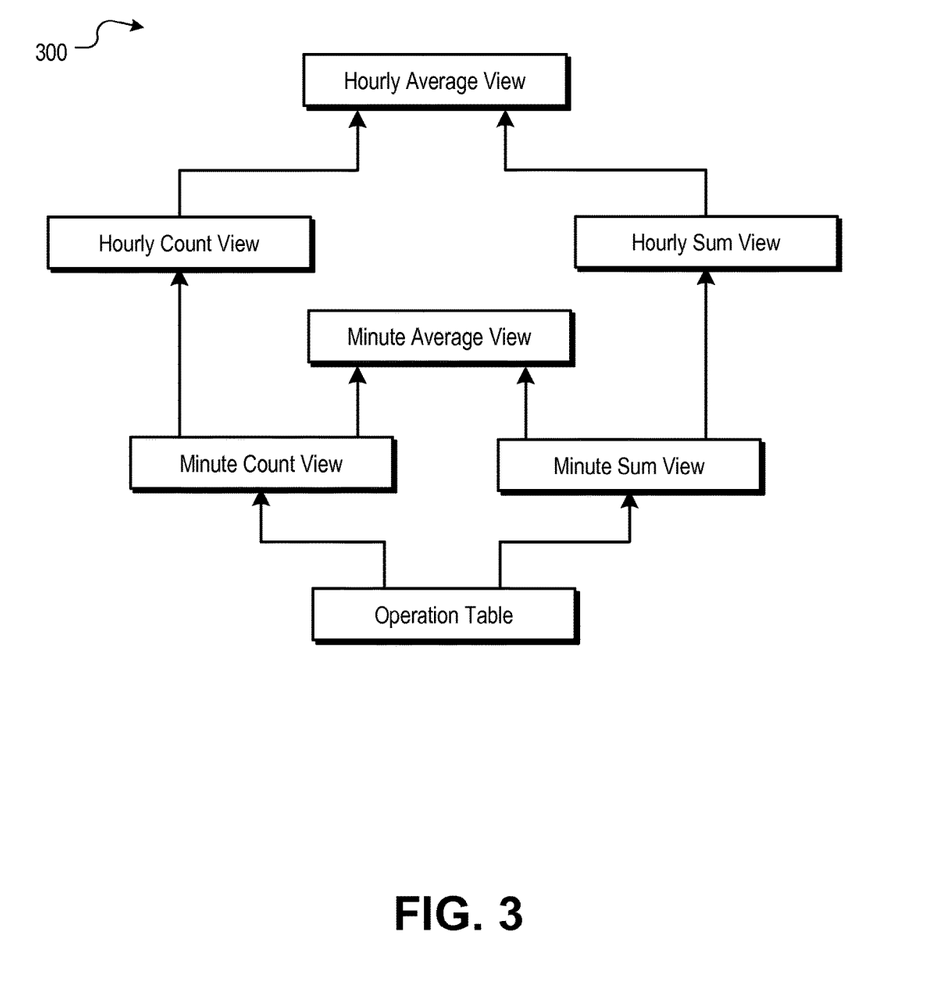
FIG. 3 is a block diagram illustrating an example view family hierarchy comprising views having one or more lossless aggregation relationships with other views in the hierarchy.

FIG. 3 is a block diagram illustrating an example view family hierarchy 300 of a view family comprising views having one or more lossless aggregation relationships with other views in the view family. Where a first view within a view family has a lossless aggregation relationship with another view in the view family, the first view can be located higher than the other view in the view family hierarchy. For example, each row of an hourly count view can be derived from a minute count view without a loss in information or accuracy, thus the hourly count view has a lossless aggregation relationship with the minute count view. Therefore, the hourly count view can be located higher than the minute count view in the view family hierarchy 300.

Generally, a view family hierarchy can consist of a set of overlapping trees where multiple ancestors can co-exist. For example, an hourly average view can be aggregated from an hourly count view and an hourly sum view, and a minute average view can be aggregated from a minute count view and a minute sum view. The view family hierarchy 300 can facilitate the derivation of a minute average view and an hourly average view from input data (e.g., data stored in minute count view and minute sum view). In the view family hierarchy 300, both the hourly average view and the minute average view share two common nodes, the minute count view and the minute sum view. Where the minute count view and minute sum view are shared by the hourly average view and the minute average view, the minute count view and the minute sum view can be used to populate both the minute average view and the hourly count and hourly sum views, thus the operation table does not have to be accessed in order to populate the hourly count and hourly sum views.

Figure 4:
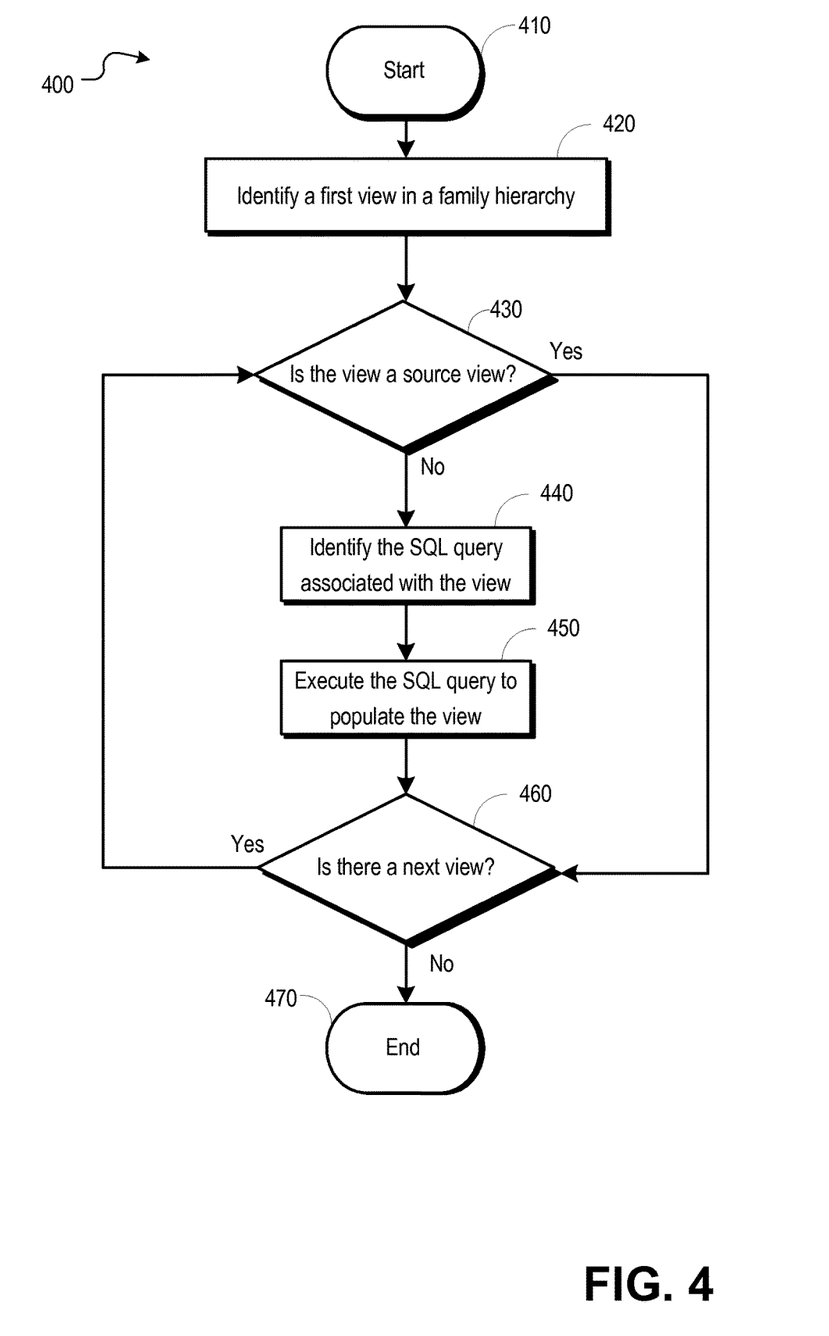
FIG. 4 is a flowchart illustrating an example process operable to continuously aggregate one or more input data streams.

FIG. 4 is a flowchart illustrating an example process 400 operable to continuously aggregate one or more input data streams. The process 400 can start at stage 410 when a family hierarchy associated with a view family is identified for traversal. For example, an aggregation engine 120 of FIG. 1 can identify one of a plurality of family hierarchies stored in the aggregation engine for traversal.

After a family hierarchy is identified for traversal, the process 400 can proceed to stage 420. At stage 420, a first view in the family hierarchy can be identified. A first view in the family hierarchy can be identified, for example, by an engine associated with a RDBMS (e.g., aggregation engine 120). In some implementations, the aggregation engine 120 can identify the lowest-level view in the family hierarchy. For example, the lowest-level view in a family hierarchy can be the first view on the left of the lowest level of views in the family hierarchy (e.g., minute count view of FIG. 3).

After a first view is identified, the process 400 can proceed to stage 430. At stage 430, a determination can be made whether the identified view is a source view. The determination whether the identified view is a source view can be made, for example, by an engine associated with a RDBMS (e.g., aggregation engine 120). For example, a source view can be a view storing data from an input data stream (e.g., operation table of FIG. 3). In some implementations, if the identified view is not a source view, the process 400 can proceed to stage 440.

At stage 440, an SQL query associated with the identified view can be identified. The SQL query associated with the identified view can be identified, for example, by an aggregation engine (e.g., aggregation engine 120). For example, the SQL query associated with the identified view can be identified from the list of SQL queries parsed from a query task and stored by the aggregation engine 120 at stage 220 of FIG. 2. In some implementations, the SQL query can provide instructions for an RDBMS 130 to populate a view associated with the SQL query. For example, the SQL query associated with the hourly count view of FIG. 3 can instruct the RDBMS 130 to aggregate the minute count view of FIG. 3 for one hour.

In various implementations, the SQL query can define input and output helper views to be used in the execution of the SQL query. For example, the SQL query associated with the minute average view of FIG. 3 can instruct the RDBMS 130 to populate the output helper view, the minute average view, from two input helper views, the minute count view and the minute sum view.

After an SQL query associated with the identified view is identified, the process 400 can proceed to stage 450. At stage 450, the identified SQL query can be executed. The identified SQL query can be executed, for example, by RDBMS logic (e.g., RDBMS 130). In some implementations, the RDBMS 130 can aggregate lower views in a family hierarchy to populate an identified view. For example, in executing the SQL query associated with the hourly count view of FIG. 3, an RDBMS 130 can populate the hourly count view by aggregating a plurality of minute count views (e.g., aggregating the minute count views within the one hour period associated with the hourly count view). After the identified SQL query is executed, the process 400 can proceed to stage 460.

Returning to stage 430, if the identified view is a source view, the process 400 can proceed to stage 460. At stage 460, a determination can be made whether there is a next view in the family hierarchy (e.g., a view located above or to the right of the currently identified view in the family hierarchy). If there is a next view in the family hierarchy, the next view can be identified and the process 400 can proceed to stage 430. If there is not a next view in the family hierarchy, the process 400 can end at stage 470.

What is claimed is:

1. A computer-implemented method, comprising:
adding one or more continuous query tasks into a registry;
removing one or more out-of-date query tasks from the registry;
parsing each respective one continuous query task of one or more continuous query tasks that are within the registry into a plurality of structured query language queries and a plurality of views associated with the plurality of structured query language queries;
defining a plurality of views comprising input views and output views for the plurality of structured query language queries, wherein one or more of the structured query language queries are associated with at least one of an input view and an output view, and wherein a plurality of input views matches a plurality of input data streams, and a plurality of output views matches a plurality of output data streams;
dividing the plurality of views into one or more view families, wherein views in each view family have a lossless aggregation relationship among the views;
merging a plurality of small view families into one or more large view families such that none of the one or more view families share a common view;
for each view family, generating a family hierarchy among the plurality of views within one or more of the view families, wherein the family hierarchy is based on matching output views and corresponding structured query language queries with input views and corresponding structured query language queries, wherein the family hierarchy comprises an operation table at the bottom of the family hierarchy, the operation table comprising input data, wherein the family hierarchy comprises one or more views that are populated directly from the operation table, the one or more views being located directly above the operation table within the family hierarchy, and wherein one or more higher level views are populated directly from the one or more views populated directly from the operation table, the one or more higher level views being located directly above the one or more views populated directly from the operation table, wherein the data populated in the one or more higher level views is of a coarser granularity than data of the one or more views that are populated directly from the operation table; and
for each view family, starting from the bottom, continuously aggregating one or more of the plurality of views into one or more aggregate output data streams, wherein the one or more aggregate output data streams comprise at least one higher level view that is populated from one or more lower level views within the associated family hierarchy.

2. The computer-implemented method of claim 1, wherein the one or more aggregate output data streams comprise low-volume data streams.

3. The computer-implemented method of claim 1, wherein the aggregation of the one or more of the plurality of views into the one or more aggregate output data streams occurs in real-time.

4. The computer-implemented method of claim 1, further comprising:
presenting the one or more aggregate output data streams in one or more rolling application windows.

5. A system, comprising:
a registry operable to store query tasks, wherein one or more continuous query tasks are added to the registry, and one or more out-of-date query tasks are removed from the registry;
an engine operable to:
parse each respective one continuous query task of one or more continuous query tasks that are within the registry into one or more structured query language queries and one or more views associated with the one or more structured query language queries, wherein one or more of the structured query language queries are associated with at least one of an input view and an output view, and wherein a plurality of input views matches a plurality of input data streams, and a plurality of output views matches a plurality of output data streams;
divide the plurality of views into one or more view families, wherein views in each view family have a lossless aggregation relationship among the views;
merge a plurality of small view families into one or more large view families such that none of the one or more view families share a common view;
for each view family, generate a family hierarchy among the plurality of views within one or more of the view families, wherein the family hierarchy is based on matching output views and corresponding structured query language queries with input views and corresponding structured query language queries, wherein the family hierarchy comprises an operation table at the bottom of the family hierarchy, the operation table comprising input data, wherein the family hierarchy comprises one or more views that are populated directly from the operation table, the one or more views being located directly above the operation table within the family hierarchy, and wherein one or more higher level views are populated directly from the one or more views populated directly from the operation table, the one or more higher level views being located directly above the one or more views populated directly from the operation table, wherein the data populated in the one or more higher level views is of a coarser granularity than data of the one or more views that are populated directly from the operation table; and a relational database management system operable to, for each view family, starting from the bottom, continously aggregate one or more input data streams into one or more output data streams, wherein the one or more output data streams comprise at least one higher level view that is populated from one or more lower level views within the associated family hierarchy.

6. The system of claim 5, wherein the one or more input data streams comprise high-volume data streams and the one or more output data streams comprise low-volume data streams.

7. The system of claim 5, wherein the query task comprises a query task received from an application and generated from requirements associated with the application.

8. The system of claim 5, wherein the relational database management system is further operable to aggregate the one or more input data streams into the one or more output data streams in real-time.

9. The system of claim 5, wherein the relational database management system is further operable to present the one or more output data streams to an application, or other destination, in one or more rolling application windows.

10. One or more non-transitory computer readable media operable to execute on a processor, the computer readable being operable to cause the processor to perform the operations comprising:

adding one or more continuous query tasks into a registry;

removing one or more out-of-date query tasks from the registry;

parsing each respective one continuous query task of one or more continuous query tasks that are within the registry into a plurality of structured query language queries and a plurality of views associated with the plurality of structured query language queries;

defining one or more input views and an output view for each of the plurality of structured query language queries, wherein one or more of the structured query language queries are associated with at least one of an input view and an output view, and wherein a plurality of input views matches a plurality of input data streams, and a plurality of output views matches a plurality of output data streams;

dividing the plurality of views into one or more view families, wherein views in each view family have a lossless aggregation relationship among the views;

merging a plurality of small view families into one or more large view families such that none of the one or more view families share a common view;

for each view family, generating a family hierarchy associated with the one or more views within one or more view families, wherein the family hierarchy is based on matching output views and corresponding structured query language queries with input views and corresponding structured query language queries, wherein the family hierarchy comprises an operation table at the bottom of the family hierarchy, the operation table comprising input data, wherein the family hierarchy comprises one or more views that are populated directly from the operation table, the one or more views being located directly above the operation table within the family hierarchy, and wherein one or more higher level views are populated directly from the one or more views populated directly from the operation table, the one or more higher level views being located directly above the one or more views populated directly from the operation table, wherein the data populated in the one or more higher level views is of a coarser granularity than data of the one or more views that are populated directly from the operation table; and for each view family, starting from the bottom, continuously aggregating one or more input data streams into one or more output data streams, wherein the one or more aggregate output data streams comprise at least one higher level view that is populated from one or more lower level views within the associated family hierarchy.

11. The one or more non-transitory computer-readable media of claim 10, wherein the one or more input data streams comprise high-volume data streams and the one or more output data streams comprise low-volume data streams.

12. The one or more non-transitory computer-readable media of claim 10, wherein the aggregation of the one or more input data streams into the one or more output data streams occurs in real-time.

13. The one or more non-transitory computer-readable media of claim 10, wherein the computer readable is further operable to cause the processor to:

present the one or more output data streams in one or more rolling application windows.

* * * * *